(12) United States Patent
Heiden et al.

(10) Patent No.: US 11,878,617 B2
(45) Date of Patent: Jan. 23, 2024

(54) MOTOR VEHICLE SEAT

(71) Applicant: Faurecia Autositze GmbH, Stadthagen (DE)

(72) Inventors: Sascha Heiden, Stadthagen (DE); Christian Neyrinck, Stadthagen (DE); Viktoriya Chernysh, Pforzheim (DE); Javier Gil, Barcelona (ES); Hélène Chassaing, Hannover (DE); Tammo De Ligny, Etampes (FR); Dagmar Brockschnieder, Stadthagen (DE); Silvia Krömer, Stadthagen (DE)

(73) Assignee: Faurecia Autositze GmbH, Stadthagen (DE)

( * ) Notice: Subject to any disclaimer, the term of this patent is extended or adjusted under 35 U.S.C. 154(b) by 399 days.

(21) Appl. No.: 16/776,939

(22) Filed: Jan. 30, 2020

(65) Prior Publication Data

US 2020/0238877 A1 Jul. 30, 2020

(30) Foreign Application Priority Data

Jan. 30, 2019 (DE) ...................... 10 2019 102 396.3

(51) Int. Cl.
*B60N 2/90* (2018.01)
*B60N 2/60* (2006.01)
(Continued)

(52) U.S. Cl.
CPC .......... *B60N 2/976* (2018.02); *A61H 9/0078* (2013.01); *B60N 2/6036* (2013.01); *B60R 7/005* (2013.01);
(Continued)

(58) Field of Classification Search
CPC .......... Y10S 297/03; A61H 2201/0149; A61H 2205/081; A61H 9/0078; B60N 2/665;
(Continued)

(56) References Cited

U.S. PATENT DOCUMENTS 5,509,155 A * 4/1996 Zigarac ................ A61G 5/1043
297/219.1
5,619,764 A * 4/1997 Lopau ................ A61G 7/05776
5/713
(Continued)

FOREIGN PATENT DOCUMENTS

CH 296304 A 2/1954
CN 204432455 U 7/2015
(Continued)

OTHER PUBLICATIONS

German Search Report dated Sep. 26, 2019 with respect to counterpart German patent application 10 2019 102 396.3.
(Continued)

*Primary Examiner* — Sarah B McPartlin
(74) *Attorney, Agent, or Firm* — Henry M. Feiereisen LLC (57) ABSTRACT

A removable seat cushion with a massage function rests on a motor vehicle seat and includes a support mat which can be arranged on the front of a backrest of a motor vehicle seat, a fastener which is suitable for fastening the seat cushion to the motor vehicle seat, a plurality of actuators, with the actuators being arranged on the support mat, at least one peripheral device and one receiving device capable of accommodating the peripheral device.

19 Claims, 5 Drawing Sheets

(51) Int. Cl.
　　　*A61H 9/00*　　　(2006.01)
　　　*B60R 7/00*　　　(2006.01)
　　　*B60R 7/04*　　　(2006.01)
(52) U.S. Cl.
　　　CPC ...... *B60R 7/043* (2013.01); *A61H 2201/0149* (2013.01); *A61H 2205/081* (2013.01)
(58) Field of Classification Search
　　　CPC ...... B60N 2/976; B60N 2/6036; A47C 7/425; A47C 7/021; A47C 27/10; A47C 7/467; B60R 7/005; B60R 7/043
　　　USPC ............................................ 297/219.1, 228.1
　　　See application file for complete search history.

(56) References Cited

U.S. PATENT DOCUMENTS

| | | | | |
|---|---|---|---|---|
| 5,713,631 | A * | 2/1998 | O'Neill | A47C 27/082<br>297/284.6 |
| 6,823,549 | B1 * | 11/2004 | Hampton | A61G 5/1043<br>297/284.6 |
| 7,857,387 | B2 * | 12/2010 | Habegger | B60N 2/665<br>297/284.6 |
| 8,052,630 | B2 * | 11/2011 | Kloecker | A61F 5/34<br>602/75 |
| 9,867,476 | B1 * | 1/2018 | Thomas | A47C 27/081 |
| 11,083,379 | B2 * | 8/2021 | Perraut | A61B 5/4836 |
| 2009/0284056 | A1 * | 11/2009 | Chico | A47C 31/113<br>297/228.1 |
| 2018/0027987 | A1 * | 2/2018 | Calhoun | A47C 7/62 |

FOREIGN PATENT DOCUMENTS

| | | | |
|---|---|---|---|
| CN | 205871798 U | 1/2017 | |
| DE | 9016551 U1 | 4/1991 | |
| DE | 29705530 U1 | 7/1997 | |
| JP | 2009507562 A * | 2/2009 | ............ A61H 15/00 |

OTHER PUBLICATIONS

Translation of German Search Report dated Sep. 26, 2019 with respect to counterpart German patent application 10 2019 102 396.3.

Operating instructions for Medisana Massage Chair MC 820/MC 822, 2014.

* cited by examiner

MOTOR VEHICLE SEAT

CROSS-REFERENCES TO RELATED APPLICATIONS

This application claims the priority of German Patent Application, Serial No. 10 2019 102 396.3, filed Jan. 30, 2019, pursuant to 35 U.S.C. 119(a)-(d), the disclosure of which is incorporated herein by reference in its entirety as if fully set forth herein.

BACKGROUND OF THE INVENTION

The present invention relates to a motor vehicle seat, and in particular to a removable seat cushion with a massage function which rests on a motor vehicle seat.

The following discussion of related art is provided to assist the reader in understanding the advantages of the invention, and is not to be construed as an admission that this related art is prior art to this invention.

Driving long distances may cause strain for the occupants of motor vehicles, in particular for the driver. This can result in exhaustion due to a combination of a prolonged concentration phase, unchanged sitting posture, insufficient air circulation between the back of the occupant and the backrest of the motor vehicle seat, and a motor vehicle seat that is not or only inadequately adapted to the individual physical dimensions of the occupant. These strains are not only uncomfortable for the driver but may also endanger the safety of the driver and the safety of other road users if the signs of fatigue have a negative impact on the driver's performance.

One approach to reduce the strain, particularly for the driver, is to massage the back and buttocks while driving. Expensive motor vehicles often have motor vehicle seats with a massage function. Seat cushions with a massage function are a cheaper alternative. Such seat cushions may also be flexibly used in other environments, for example in the workplace on office chairs or in the home for relaxation. The seat cushions are attached to the motor vehicle seat using straps, bands (rubber) or other fastening means.

Document CN205871798U introduces a seat cushion that provides a massage function by means of air pockets. The air pockets have massage points that are designed as nubs that are filled and/or emptied by a pump and valves.

CN204432455U shows a seat cushion that achieves a massage function by using pneumatically driven massage balls. These balls are accommodated in a flexible rubber bladder.

Conventional seat cushions with a massage function have many shortcomings disadvantages. Due to the technology used (knobs or balls), the seat cushions are relatively thick. The additional components used to control and operate the air pockets or massage balls take up space in the seat cushion itself or in the interior of the motor vehicle and may increase the risk of injury to an occupant in the event of an accident. The side airbags installed in the vehicle seat may be covered and not deploy correctly in the event of an accident. Furthermore, the peripheral devices, such as the pump, the controller, the valves or the power supply cannot be securely accommodated in the known seat cushions. Therefore, vehicle occupants could be injured by flying parts.

For the reasons mentioned, the use of such seat cushions with a massage function while riding in or operating motor vehicles is generally outlawed. Occupants are furthermore able to feel the seat cushion even when it is not in use, which reduces the comfort for the occupant.

It would therefore be desirable and advantageous to provide an improved removable seat cushion with a massage function to obviate prior art shortcomings and to comply with legal requirements for use in particular while riding in or operating a motor vehicle.

It would further be desirable and advantageous to provide an improved seat cushion with a massage function which has no or so few additional components or whose dimensions are such that there is no increased risk of injury to an occupant due to the use of the seat cushion.

It would still further be desirable and advantageous to provide an improved holding device for the equipment in the interior of motor vehicles, in particular for headrests, which, due to a strong force such as the force generated in a rear-end collision, remains locked in its position both in the longitudinal direction and when moving about the vertical axis and which therefore cannot fly around is the interior of the motor vehicle and thus reduces the risk of injury to an occupant.

SUMMARY OF THE INVENTION

According to one aspect of the present invention, a removable seat cushion with a massage function for placement on a motor vehicle seat includes a support mat for arrangement on a front of a backrest of a motor vehicle seat, a fastener configured for fastening the seat cushion to the motor vehicle seat, a plurality of actuators arranged on the support mat, a peripheral device, and a receiving device configured to receive the peripheral device.

A removable seat cushion according to the invention has a massage function with a support mat which can be arranged on the front of the backrest of a motor vehicle seat. Furthermore, the removable seat cushion has a fastener with which the removable seat cushion can be fastened to the motor vehicle seat. A plurality of actuators and also a receiving device which is suitable for receiving at least one peripheral device are arranged on the support mat.

According to another advantageous feature of the present invention, the receiving device can be positioned and in particular fastened separately at a spatial distance from the support mat. It is preferred that the receiving device is fastened to the back of the backrest of the motor vehicle seat. The peripheral device contains the devices necessary for operating the seat cushion. This arrangement secures the peripheral device while the vehicle is operated and thus reduces the risk of injury to an occupant, in particular due to a rear-end collision.

According to another advantageous feature of the present invention, the fastener can have straps. The straps can be designed to be adjustable in such a way that they can be adapted to the varying dimensions of different motor vehicle seats. As a result, the seat cushion according to the invention is not only limited to being used in motor vehicles but also, for example, at the workplace on office chairs and at home. At the same time, a secure connection of the support mat to the motor vehicle seat is guaranteed; the support mat cannot accidentally come off or slip.

According to another advantageous feature of the present invention, the straps can be configured to encompass the backrest of the motor vehicle seat, preferably in the lower region of the seat cushion. This ensures a secure connection between the support mat and the motor vehicle seat; the support mat cannot accidentally come off or slip.

According to another advantageous feature of the present invention, the fastener can have a cover which can be arranged on the back of the backrest of the motor vehicle seat. The cover can be located on the top of the support mat. The cover can be connected to the mat. The cover can be designed to be adjustable in such a way that it can be adapted to the varying dimensions of different motor vehicle seats, for example by means of a Velcro fastener. As a result, the seat cushion according to the invention is not only limited to being used in motor vehicles but also, for example, at the workplace on office chairs and at home.

According to another advantageous feature of the present invention, the cover can have an opening for the headrest of the motor vehicle seat. The seat cushion according to the invention can be placed over the headrest by means of the opening, and therefore the headrest is not covered by the seat cushion. The headrest can thus be adjusted by the occupant at any time and any existing safety functions (e.g. a crash-active headrest) remain fully functional.

According to another advantageous feature of the present invention, the cover can have fastening means to connect the cover to the support mat. The fastening means of the cover can be arranged on the sides of the backrest of the motor vehicle seat. The cover can be connected to the mat by the fastening means. At the same time, these fastening means connect the cover with the sides of the backrest of the motor vehicle seat. The fastening means of the cover are designed to be adjustable in such a way that they can be adapted to the varying dimensions of different motor vehicle seats, for example by means of a Velcro fastener. At the same time, the fastening means are dimensioned such that the side airbags remain fully functional in the event of an accident.

According to another advantageous feature of the present invention, the peripheral device can have a controller and/or a power supply. The controller is usually a microcomputer with an operating element, which has a corresponding program for controlling the massage process. Using the controller, an occupant can start the massage process, choose from various massage programs and end the massage process. The power supply is advantageously designed such that it can be operated via the vehicle's electrical system. Power can be supplied, for example, from a socket (cigarette lighter), USB connection or the like. To use the seat cushion outside of a motor vehicle, a transformer may be inserted between the seat cushion and the socket.

According to another advantageous feature of the present invention, the receiving device can be arranged on the cover of the seat cushion. As a result, the receiving device is arranged on the back of the backrest of the motor vehicle seat. This arrangement secures the receiving device while the vehicle is operated and thus reduces the risk of injury to an occupant, in particular due to a rear-end collision.

According to another advantageous feature of the present invention, the receiving device can have a bag. The bag can be reclosed with a zipper, for example. The peripheral device is thus easily accessible in the event of maintenance and can be easily replaced or serviced.

According to another advantageous feature of the present invention, the bag has sound-absorbing elements. The sound-absorbing elements can be made, for example, of foam and reduce the noise coming from the peripheral device.

According to another advantageous feature of the present invention, the actuators can be arranged in a plurality of horizontal rows, preferably in 3 or more horizontal rows and particularly preferably in 5 or more horizontal rows. This arrangement of the actuators makes it possible to massage a large portion of an occupant's back.

According to another advantageous feature of the present invention, the actuators can be arranged in a plurality of vertically arranged columns. This arrangement of the actuators makes it possible to massage a large portion an occupant's back and, at the same time, is so narrow that the side airbags in the motor vehicle seat are not covered by the support mat.

According to another advantageous feature of the present invention, the distance d between a vertical column and the center of the backrest can be less than d=10 cm, preferably less than d=7.5 cm and particularly preferably less than d=5 cm. This arrangement of the actuators makes it possible to massage a large portion an occupant's back and, at the same time, is so narrow that the side airbags in the motor vehicle seat are not covered by the support mat. The side airbags are therefore fully functional in the event of an accident.

According to another advantageous feature of the present invention, the foam layer can be arranged over a large portion of the actuators. When not in use, the support mat is hardly noticeable to the occupant because the support mat adapts almost perfectly to the contours of the motor vehicle seat.

According to another advantageous feature of the present invention, the actuators can be operated pneumatically. They are filled by an air pump and several valves as well as hose connections, which are controlled by a controller.

The side of the support mat facing the occupant can be made of a flexible but robust fabric. On the side of the support mat facing away from the occupant there is an inlet that is reinforced but flexible such that almost all of the pressure that is generated by the pump and valves in the actuators is directed toward the back of the occupant. Compared to the seat cushions with a massage function known from prior art, the seat cushion according to the invention offers the advantage that the massage function can also be used when the motor vehicle is in operation. The absence of mechanical components such as massage balls reduces the risk of injury to the occupant in the event of an accident and at the same time increases the comfort provided by a full massage function.

According to another advantageous feature of the present invention, the pneumatically operable actuators can be air pockets. The actuators are designed as air pockets, which means that they are pneumatically filled and emptied by means of air. The seat cushion according to the invention offers the advantage that the massage function can also be used when the motor vehicle is in operation. The absence of mechanical components such as massage balls reduces the risk of injury to the occupant in the event of an accident and at the same time increases the comfort provided by a full massage function.

According to another advantageous feature of the present invention, the peripheral device can have a pump and/or one or more valves. The actuators can be filled with air or emptied again by means of the pump and the valves.

According to another advantageous feature of the present invention, the pneumatically operable actuators can be filled individually in a better manner and/or independently of one another. This allows an occupant to select the most suitable massage program from the various programs and to start and end it at any time.

According to another advantageous feature of the present invention, each actuator can have a direct hose connection to the pump. This allows an occupant to select the most suitable massage program from the various programs and to start and end it at any time. The hoses are made of a soft, flexible material. The thickness of the hoses of the hose connections are dimensioned such that the hoses are not or only hardly noticeable by an occupant.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 1:
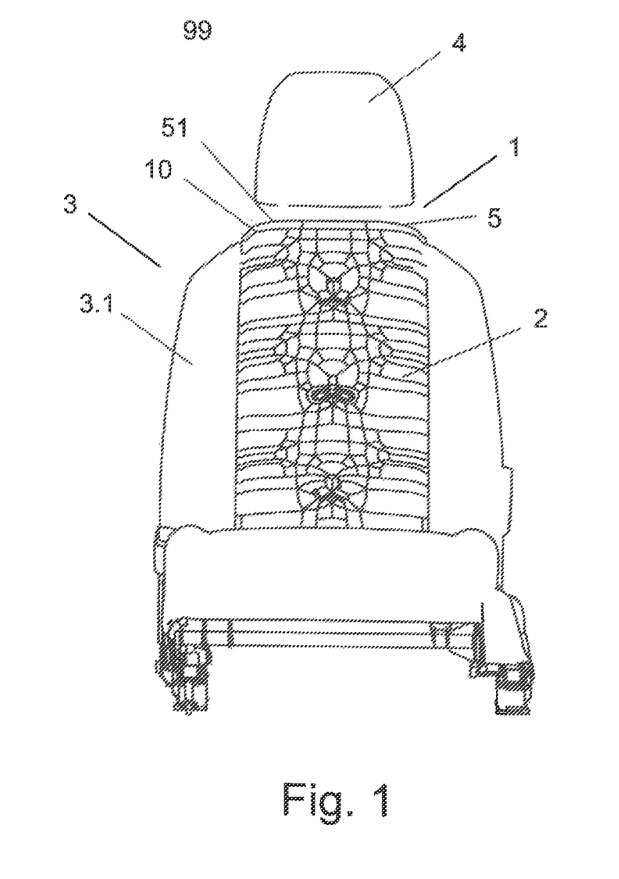
FIG. 1 shows a front view of a removable seat cushion according to the present invention with a massage function, which is fastened to a motor vehicle seat and ready for use.

Turning now to the drawing, and in particular to FIG. 1, there is shown a

Turning now to the drawing, and in particular to FIG. 1, there is shown a front view of a removable seat cushion according to the present invention with a massage function, which is fastened to a motor vehicle seat 99 and ready for use. The seat cushion has a support mat 2 which is arranged on the front 3.1 of the backrest 3 of a motor vehicle seat 99. Furthermore, the removable seat cushion 1 has a fastener 10 with which the removable seat cushion 1 is fastened to the motor vehicle seat 99. The motor vehicle seat 99 itself has a headrest 4 above the backrest 3.

The seat cushion 1 is fastened to the motor vehicle seat 99 with one or more fastener 10. The lower area of the support mat 2 preferably has one strap 11 on each side of the support mat 2, which is guided around the lower area of the backrest 3 and encompasses the backrest 3. On the back of the backrest 32, both straps 11 are connected to one another, for example by an adjustable clip fastener or Velcro fastener. A cover 5 with an opening 51 is arranged on top of the support mat 2. This opening 51 is dimensioned such that the headrest 4 of the motor vehicle seat 99 can be passed through it. The cover 5 is connected to the support mat 2 by fastening means 52. These fastening means 52 connect the cover 5 to the sides of the backrest 3 of the motor vehicle seat 99. The fastener 10 of the support mat 2 and the fastening means 52 of the cover 5 are designed to be adjustable such that they can be adapted to the varying dimensions of different motor vehicle seats 99, for example by means of a Velcro fastener. As a result, the seat cushion 1 according to the invention is not only limited to being used in motor vehicles but also, for example, at the workplace on office chairs and at home. At the same time, a secure connection of the support mat 2 to the motor vehicle seat 99 is guaranteed; the support mat 2 cannot accidentally come off or slip.

A plurality of actuators 20, 21, 22, 23, 24, 25, 26, 27, 28, 29, which perform the actual massage, are arranged on the support mat 2. The actuators 20, 21, 22, 23, 24, 25, 26, 27, 28, 29 are arranged in a matrix in horizontally aligned rows or vertically aligned columns with 5 horizontal rows being particularly preferred. In this exemplary embodiment, a total of 10 actuators 20, 21, 22, 23, 24, 25, 26, 27, 28, 29 are arranged in 5 rows and 2 columns. This arrangement of the actuators 20, 21, 22, 23, 24, 25, 26, 27, 28, 29 makes it possible to massage a large portion of an occupants back and, at the same time, is so narrow that the side airbags in the motor vehicle seat 99 are not covered by the support mat 2. The distance d of a vertical column is less than d=7 cm, with less than d=3 cm being particularly preferred. The side airbags are therefore fully functional in the event of an accident.

A foam layer 2.1 is arranged on the actuators 20, 21, 22, 23, 24, 25, 26, 27, 28, 29 over such a large area that the actuators 20, 21, 22, 23, 24, 25, 26, 27, 28, 29 are ideally completely covered by the foam layer 2.1. When not in use (emptied actuators 20, 21, 22, 23, 24, 25, 26, 27, 28, 29), the support mat 2 cannot or can hardly be perceived by the occupant because the support mat 2 adapts almost perfectly to the contours of the motor vehicle seat 99.

Compared to seat cushions with a massage function known from prior art, the seat cushion 1 according to the invention also offers the advantage that the massage function can be used when the motor vehicle is in operation as well. The absence of mechanical components such as massage balls reduces the risk of injury to the occupant in the event of an accident and at the same time increases the comfort provided by a full massage function.

Figure 2:
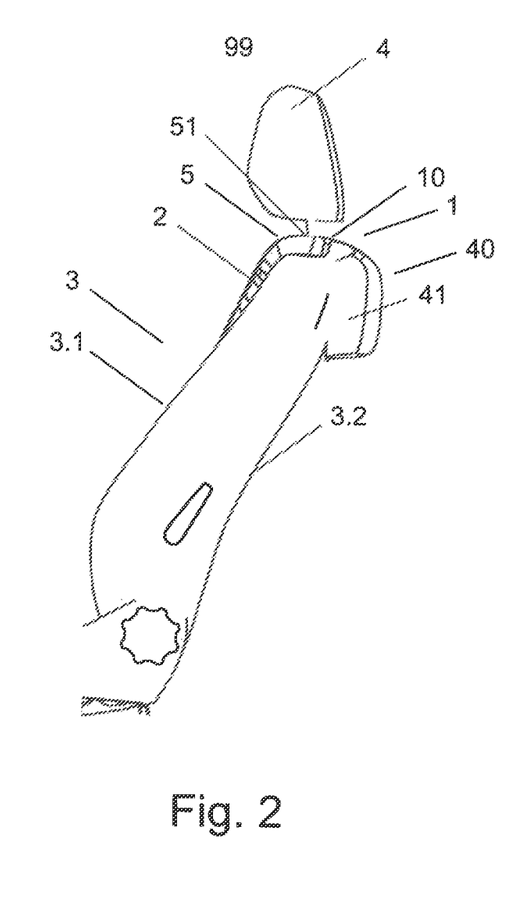
FIG. 2 shows a side view of the removable seat cushion according to the invention with a massage function, which is fastened to a motor vehicle seat and ready for use.

FIG. 2 shows a side view of the seat cushion 1 according to the invention, which is fastened to a motor vehicle seat 99 and ready for use. The support mat 2 is arranged on the front 3.1 of the backrest 3 of a motor vehicle seat 99. Furthermore, the removable seat cushion 1 has a fastener 10 with which the removable seat cushion 1 is fastened to the motor vehicle seat 99. The motor vehicle seat 99 itself has a headrest 4 which is located above the backrest 3.

The seat cushion 1 is fastened to the motor vehicle seat 99 with one or more fasteners 10. The lower area of the support mat 2 preferably has one strap 11 on each side of the support mat 2, which is guided around the lower area of the backrest 3 and encompasses the backrest 3. On the back of the backrest 3.2, both straps 11 are connected to one another, for example by a clip fastener or Velcro fastener. A cover 5 with an opening 51 is arranged on top of the support mat 2. This opening 51 is dimensioned such that the headrest 4 of the motor vehicle seat 99 can be passed through it. The cover 5 is connected to the support mat 2 by fastening means 52. These fastening means 52 connect the cover 5 to the sides of the backrest 3 of the motor vehicle seat 99. The fastener 10 of the support mat 2 and the fastening means 52 of the cover 5 are designed to be adjustable such that they can be adapted to the varying dimensions of different motor vehicle seats 99, for example by means of a Velcro fastener.

A plurality of actuators 20, 21, 22, 23, 24, 25, 26, 27, 28, 29, which perform the actual massage, are arranged on the support mat 2. The actuators 20, 21, 22, 23, 24, 25, 26, 27, 28, 29 are arranged in a matrix in horizontally aligned rows or vertically aligned columns.

The actuators 20, 21, 22, 23, 24, 25, 26, 27, 28, 29 are designed as air pockets, which means that they are pneumatically filled and emptied by means of air. They are filled by an air pump 33 and a valve device 34 as well as hose connections, which are controlled by a controller 31.

The side of the support mat 2 facing the occupant consists of a flexible but robust fabric, which preferably does not cause sweating. On the side of the support mat 2 facing away from the occupant there is an inlet that is reinforced but flexible such that almost all of the pressure that is generated by the pump 33 and the valve device 34 in the actuators 20, 21, 22, 23, 24, 25, 26, 27, 28, 29 is directed toward the back of the occupant. The controller 31, the pump 33 and the valve device 34 with the power supply 32 are accommodated in a peripheral device 30, which is fastened to the back of the backrest 3.2 of the motor vehicle seat 99.

Figure 3:
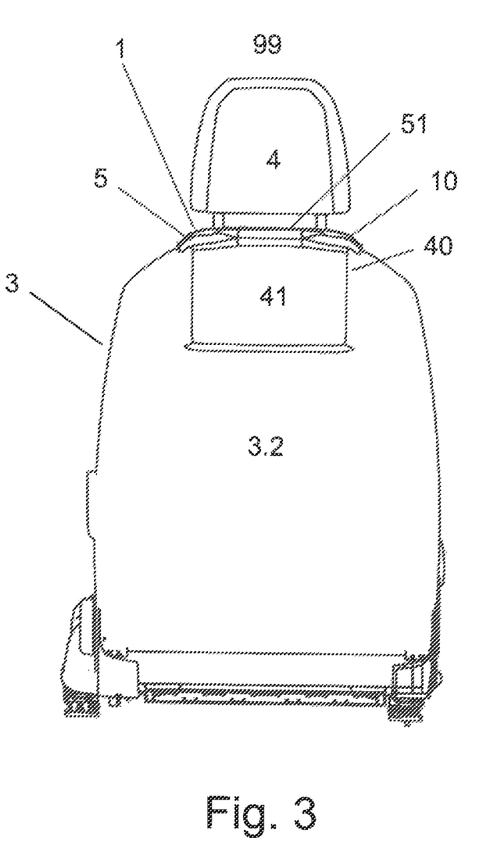
FIG. 3 shows a rear view of the removable seat cushion according to the invention with a massage function, which is fastened to a motor vehicle seat and ready for use.

FIG. 3 shows a rear view of the seat cushion 1 according to the invention, which is fastened to a motor vehicle seat 99 and ready for use. The support mat 2 is arranged on the front 3.1 of the backrest 3 of a motor vehicle seat 99. Furthermore, the removable seat cushion 1 has a fastener 10 with which the removable seat cushion 1 is fastened to the motor vehicle seat 99. The motor vehicle seat 99 itself has a headrest 4 which is located above the backrest 3.

The seat cushion 1 is fastened to the motor vehicle seat 99 with one or more fasteners 10. A cover 5 with an opening 51 is arranged on top of the support mat 2. This opening 51 is dimensioned such that the headrest 4 of the motor vehicle seat 99 can be passed through it. The cover 5 is connected to the support mat 2 by fastening means 52. These fastening means 52 connect the cover 5 to the sides of the backrest 3 of the motor vehicle seat 99.

The actuators 20, 21, 22, 23, 24, 25, 26, 27, 28, 29 are filled by an air pump 33 and the valve device 34 as well as hose connections controlled by a controller 31. The controller 31, the pump 33 and the valve device 34 with the power supply 32 are accommodated in a peripheral device 30, which is fastened to the back of the backrest 3.2 of the motor vehicle seat. When the motor vehicle is in operation, the peripheral device 30 is secured by this arrangement, which thus reduces the risk of injury, in particular due to a rear-end collision.

Figure 4:
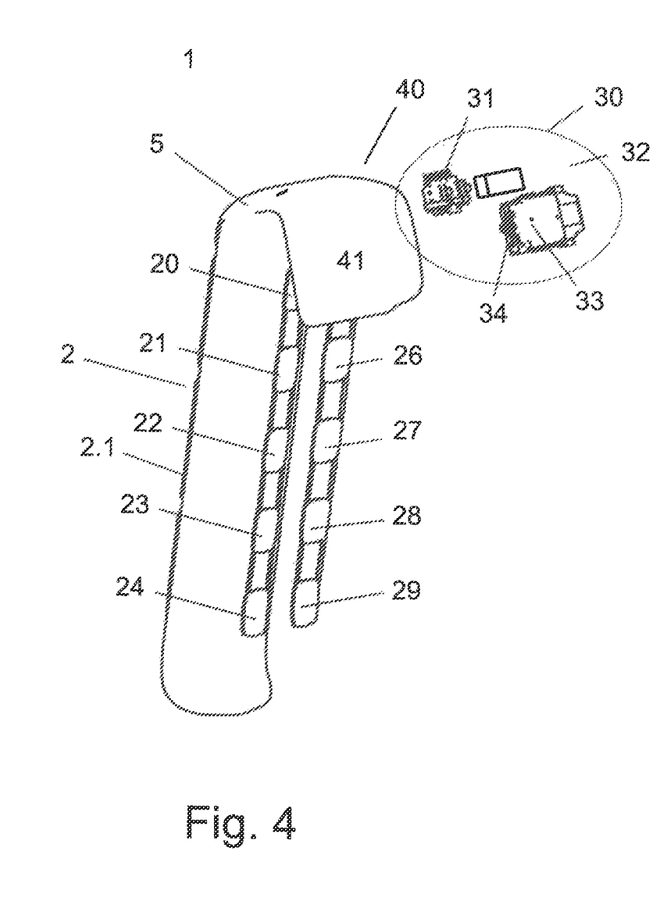
FIG. 4 shows an exploded view of the seat cushion according to the invention with a massage function from an oblique rear left viewpoint.

FIG. 4 shows an exploded drawing of the seat cushion 1 according to the invention from an oblique rear left aspect. The seat cushion 1 has a support mat 2 which is fastened to the front 3.1 of the backrest 3 of a motor vehicle seat 99. A plurality of actuators 20, 21, 22, 23, 24, 25, 26, 27, 28, 29, which perform the actual massage, are arranged on the support mat 2. The actuators 20, 21, 22, 23, 24, 25, 26, 27, 28, 29 are arranged in a matrix in horizontally aligned rows and/or vertically aligned columns.

A cover 5 with an opening 51 is arranged on top of the support mat 2. This opening 51 is dimensioned such that the headrest 4 of the motor vehicle seat 99 can be passed through it. The cover 5 is connected to the support mat 2 by fastening means 52. These fastening means 52 connect the cover 5 to the sides of the backrest 3 of the motor vehicle seat 99. The receiving device 40 is attached to the cover 5.

The receiving device 40 has fasteners 10 for fastening to the back of the backrest 3.2 of the motor vehicle seat 99 and furthermore a bag 41 for receiving the peripheral device 30. The bag 41 is ideally designed to be reclosable, for example by means of a zipper, so that the peripheral device 30 is easily accessible in the event of maintenance. Sound-absorbing elements, for example consisting of foam, can be arranged inside the bag 41 to reduce the noise generated by the peripheral device 30.

The peripheral device 30 comprises the controller 31, the pump 33, the valve device 34 and the power supply 32. The controller 31 usually comprises a microcomputer and control element, which has a corresponding program for controlling the pump 33 and the valve device 34. Using the controller 31, an occupant can start the massage process, choose from various massage programs and end the massage process. Each actuator 20, 21, 22, 23, 24, 25, 26, 27, 28, 29 is connected to the pump 33 via a direct hose connection and can therefore be individually filled or emptied independently from the other actuators 20, 21, 22, 23, 24, 26, 26, 27, 28, 29.

The power supply 32 is advantageously designed such that the seat cushion 1 can be operated completely independently by means of a power storage device (battery) 42. It is also possible to operate seat cushion 1 via the vehicle's electrical system. Power can be supplied, for example, from a socket (cigarette lighter), USB connection or the like. To use the seat cushion 1 outside a motor vehicle, a current transformer (for example a transformer with an AC/DC converter) can be inserted between the seat cushion 1 and the socket.

Figure 5:
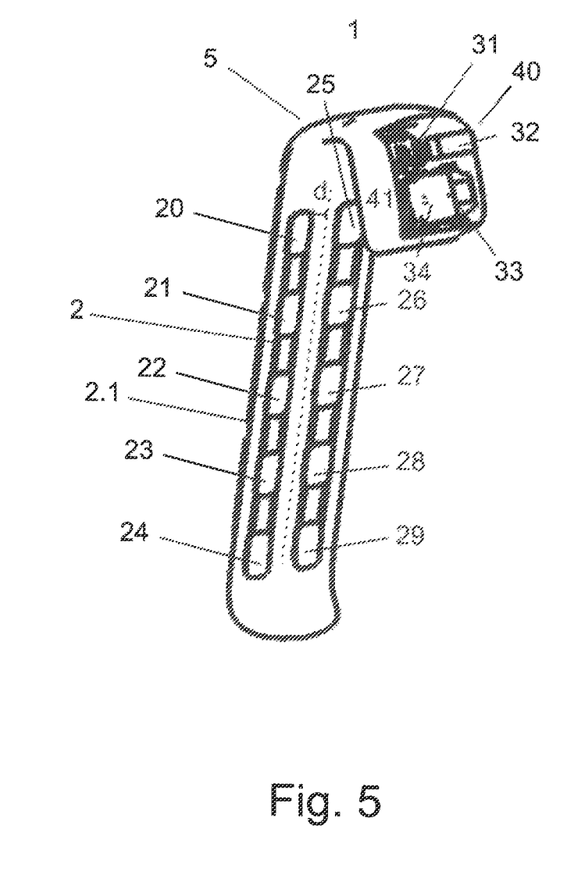
FIG. 5 shows a representation of the seat cushion according to the invention with a massage function from an oblique rear left viewpoint.

FIG. 5 shows an illustration of the seat cushion 1 according to the invention from an oblique rear left aspect, which can be fastened to a seat and ready for use.

The seat cushion 1 has a support mat 2 which is fastened to the front 3.1 of the backrest 3 of a motor vehicle seat 99. A plurality of actuators 20, 21, 22, 23, 24, 25, 26, 27, 28, 29, which perform the actual massage, are arranged on the support mat 2. The actuators 20, 21, 22, 23, 24, 25, 26, 27, 28, 29 are arranged in a matrix in horizontally aligned rows and/or vertically aligned columns.

A cover 5 with an opening 51 is arranged on top of the support mat 2. This opening 51 is dimensioned such that the headrest 4 of the motor vehicle seat 99 can be passed through it. The cover 5 is connected to the support mat 2 by fastening means 52. These fastening means 52 connect the cover 5 to the skies of the backrest 3 of the motor vehicle seat 99. The receiving device 40 is attached to the cover 5.

The receiving device 40 has fasteners 10 for fastening to the back of the backrest 3.2 of the motor vehicle seat 99 and furthermore a bag 41 for receiving the peripheral device 30. The bag 41 is ideally designed to be reclosable, for example by means of a zipper, so that the peripheral device 30 is easily accessible in the event of maintenance. Sound-absorbing elements, for example consisting of foam, can be arranged inside the bag 41 to reduce the noise generated by the peripheral device 30.

The peripheral device 30 comprises the controller 31, the pump 33, the valve device 34 and the power supply 32. The controller 31 usually comprises a microcomputer and control element, which has a corresponding program for controlling the pump 33 and the valve device 34. Using the controller 31, an occupant can start the massage process, choose from various massage programs and end the massage process. Each actuator 20, 21, 22, 23, 24, 25, 26, 27, 28, 29 is connected to the pump 33 via a direct hose connection and can therefore be individually filled or emptied independently from the other actuators 20, 21, 22, 23, 24, 25, 26, 27, 28, 29.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A removable seat cushion with a massage function for placement on a motor vehicle seat having a headrest, said removable seat cushion comprising:
   a support mat for arrangement on a front of a backrest of a motor vehicle seat;
   a plurality of pneumatically operated actuators arranged on the support mat;
   a peripheral device comprising a controller, a pump, and a valve device;
   a receiving device for arrangement on a back of the backrest and configured to receive the peripheral device;
   a cover arranged between the support mat and the receiving device, the cover comprising a fastener configured for fastening the removable seat cushion to the motor vehicle seat; and
   hose connections configured to be in connection on one end with the actuators and on another end with the pump and valve device.

2. The removable seat cushion of claim 1, wherein the fastener has straps, wherein the straps are configured to encompass the backrest of the motor vehicle seat.

3. The removable seat cushion of claim 1, wherein the cover has an opening through which the headrest of the motor vehicle passes, whereby the headrest is not covered by the removable seat cushion.

4. The removable seat cushion of claim 1, wherein the fastener is configured for arrangement on a back of the backrest of the motor vehicle seat.

5. The removable seat cushion of claim 4, wherein the cover includes fastening means to connect the cover to the support mat, said fastening means of the cover being configured for arrangement on a side of the backrest of the motor vehicle seat.

6. The removable seat cushion of claim 1, wherein the peripheral device comprises a power storage device wherein the removable seat cushion can be operated independently by the power storage device.

7. The removable seat cushion of claim 1, wherein the receiving device is arranged on the cover of the seat cushion.

8. The removable seat cushion of claim 1, wherein the receiving device includes sound-absorbing elements.

9. The removable seat cushion of claim 8, wherein the receiving device includes a bag and the bag includes the sound-absorbing elements.

10. The removable seat cushion of claim 1, wherein the actuators are arranged in a plurality of horizontal rows, preferably in 3 or more horizontal rows and particularly preferably in 5 or more horizontal rows.

11. The removable seat cushion of claim 1, wherein the actuators are arranged in a plurality of vertical columns.

12. The removable seat cushion of claim 11, wherein a distance between a vertical column and a center of the backrest is $d<10$ cm, preferably $d<7.5$ cm and particularly preferably $d<5$ cm, wherein d is the distance.

13. The removable seat cushion of claim 1, wherein the support mat comprises a foam layer which is arranged above the pneumatically operated actuators.

14. The removable seat cushion of claim 13, wherein the foam layer is arranged over a large portion of the actuators.

15. The removable seat cushion of claim 1, wherein the pneumatically operated actuators are arranged in a matrix.

16. The removable seat cushion of claim 1, wherein the pneumatically operated actuators are air pockets.

17. The removable seat cushion of claim 1, wherein the peripheral device further comprises one or more valves.

18. The removable seat cushion of claim 17, wherein each of the pneumatically operated actuators includes a direct hose connection to the pump.

19. The removable seat cushion of claim 1, wherein the pneumatically operated actuators are configured for individual filling.

* * * * *